United States Patent
Anderson et al.

(10) Patent No.: US 9,934,053 B2
(45) Date of Patent: Apr. 3, 2018

(54) OPTIMIZING THE CONFIGURATION OF VIRTUAL MACHINE INSTANCES IN A NETWORKED COMPUTING ENVIRONMENT

(71) Applicant: International Business Machines Corporation, Armonk, NY (US)

(72) Inventors: Jason L. Anderson, San Jose, CA (US); Gregory J. Boss, Saginaw, MI (US); Timothy R. Echtenkamp, Austin, TX (US); Shaun T. Murakami, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 14/287,385

(22) Filed: May 27, 2014

(65) Prior Publication Data

US 2014/0298337 A1 Oct. 2, 2014

Related U.S. Application Data

(63) Continuation of application No. 13/115,399, filed on May 25, 2011, now Pat. No. 8,769,531.

(51) Int. Cl.
*G06F 9/455* (2006.01)
*G06F 9/50* (2006.01)

(52) U.S. Cl.
CPC ........ *G06F 9/45533* (2013.01); *G06F 9/5077* (2013.01); *G06F 9/5088* (2013.01)

(58) Field of Classification Search
None
See application file for complete search history.

(56) References Cited

U.S. PATENT DOCUMENTS 6,880,002 B2    4/2005  Hirschfeld et al.
7,080,378 B1    7/2006  Noland et al.
(Continued)

OTHER PUBLICATIONS

Amazon Web Services, "Auto Scaling", http"//aws.amazon.com/autoscaling/, Mar. 29, 2011, 2 Pages.
(Continued)

*Primary Examiner* — Kenneth Tang
(74) *Attorney, Agent, or Firm* — William H. Hartwell; Hunter E. Webb; Keohane & D'Alessandro, PLLC

(57) ABSTRACT

Embodiments of the present invention provide an approach for optimizing a configuration of virtual machine (VM) instances. In a typical embodiment, such optimization comprises either the splitting of a single VM instance into multiple VM instances or the consolidation of multiple VM instances into fewer (e.g., a single) VM instance. Along these lines, it will first be determined which VM instances would be good candidates for reconfiguration. Under one approach, VM instances that are candidates for reconfiguration are identified based upon an analysis of applicable/associated service level agreement (SLA) terms versus the performance of the VM instances. For example, VM instances can be reconfigured if such reconfiguration will maximize a benefit provided by the applicable SLA terms (e.g., if the splitting of a single VM instance into multiple VM instances would cause a workload to be processed more efficiently, resulting in a more favorable cost/benefit ratio). In another embodiment, candidate VM instances can be identified based upon a commonality of an entity (e.g., a consumer) associated therewith. For example, if a single entity is utilizing multiple VM instances, such VM instances could be considered candidates for consolidation to avoid unnecessary computing resource consumption.

20 Claims, 14 Drawing Sheets

(56) References Cited

U.S. PATENT DOCUMENTS

| | | | |
|---|---|---|---|
| 7,336,623 | B2 | 2/2008 | Huitema |
| 7,496,743 | B1 | 2/2009 | Salazar et al. |
| 7,562,254 | B2 | 7/2009 | Davis et al. |
| 7,574,496 | B2 | 8/2009 | McCrory et al. |
| 7,849,221 | B2 | 12/2010 | Kumar et al. |
| 8,402,140 | B2 | 3/2013 | Zhang et al. |
| 8,423,998 | B2 | 4/2013 | Isci et al. |
| 8,510,735 | B2 | 8/2013 | Abbas et al. |
| 8,769,531 | B2* | 7/2014 | Anderson .............. G06F 9/5077 718/1 |
| 2003/0051021 | A1 | 3/2003 | Hirschfeld et al. |
| 2003/0115218 | A1 | 6/2003 | Bobbitt et al. |
| 2004/0123289 | A1* | 6/2004 | Drews .................. G06F 9/4843 718/1 |
| 2005/0060590 | A1 | 3/2005 | Bradley et al. |
| 2005/0149940 | A1* | 7/2005 | Calinescu ............. G06F 9/5061 718/104 |
| 2005/0160424 | A1 | 7/2005 | Broussard et al. |
| 2006/0230407 | A1 | 10/2006 | Rosu et al. |
| 2008/0091763 | A1 | 4/2008 | Devonshire et al. |
| 2008/0104608 | A1 | 5/2008 | Hyser et al. |
| 2008/0163239 | A1 | 7/2008 | Sugumar et al. |
| 2009/0300608 | A1 | 12/2009 | Ferris et al. |
| 2010/0088150 | A1 | 4/2010 | Mazhar et al. |
| 2010/0332657 | A1 | 12/2010 | Elyashev et al. |
| 2011/0126275 | A1* | 5/2011 | Anderson ............. H04L 9/3213 726/8 |
| 2011/0173329 | A1* | 7/2011 | Zhang .................. G06F 1/3206 709/226 |
| 2011/0302578 | A1* | 12/2011 | Isci ...................... G06F 9/5077 718/1 |
| 2012/0254434 | A1* | 10/2012 | Mehra ............... G06F 17/30286 709/226 |
| 2012/0254435 | A1 | 10/2012 | Zhoafu et al. |
| 2012/0254864 | A1* | 10/2012 | Bork .................. G06F 9/45558 718/1 |

OTHER PUBLICATIONS

Maitland, J., "Keeping Control Isn't Easy", Chapter 4: Cloud-Based Infrastructure, SearchCloudComputing.com, 13 pages.

Mell et al., "The NIST Definition of Cloud Computing", National Institute of Standards and Technology, Information Technology Laboratory, Version 15, Oct. 7, 2009, 2 pages.

Oracle, "Oracle Real Application Clusers One Node: Better Virtualization for Databases", An Oracle White Paper, Nov. 2010, 13 pages.

Mei et al., "Performance Measurements and Analysis of Network I/O Applications in a Virtualized Cloud", Georgia Institute of Technology, Atlanta, Georgia, 8 pages.

Microsoft, "Microsoft SQL Server 2008 R2, Application and Multi-Instance Management", www.microsoft.com/sqlserver/2008/en/us/r2aspx, 2008, 2 pages.

Elzbieta Sogno-Pabis, PCT Notification of Transmittal of the International Search Report and the Written Opinion of the International Searching Authority, or the Declaration, dated Aug. 28, 2012, 5 pages.

Van H. Nguyen, USPTO Office Action, U.S. Appl. No. 13/115,399, dated Sep. 11, 2013, 30 pages.

Van H. Nguyen, USPTO Notice of Allowance and Fee(s) Due, U.S. Appl. No. 13/115,399, dated Feb. 26, 2014, 57 pages.

Mei et al., "Performance Measurements and Analysis of Network I/O Applications in a Virtualized Cloud", Georgia Institute of Technology, Atlanta, Georgia, 2010 IEEE 3rd International Conference, Jul. 5-10, 2010, 8 pages.

Maitland, J., "Keeping Control Isn't Easy", Chapter 4: Cloud-Based Infrastructure, SearchCloudComputing.com, Publication Date: Oct. 2009, 19 pages.

* cited by examiner

OPTIMIZING THE CONFIGURATION OF VIRTUAL MACHINE INSTANCES IN A NETWORKED COMPUTING ENVIRONMENT

CROSS-REFERENCE TO RELATED APPLICATIONS

The present application is a continuation of U.S. patent application Ser. No. 13/115,399, filed May 25, 2011, entitled "OPTIMIZING THE CONFIGURATION OF VIRTUAL MACHINE INSTANCES IN A NETWORKED COMPUTING ENVIRONMENT", the disclosure of which is incorporated herein by reference.

TECHNICAL FIELD

The present invention relates generally to the optimization of virtual machine (VM) instances. Specifically, the present invention relates to the optimization of the configuration of VM instances in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

Within networked computing environments, it is often the case that virtual machines (VM) are utilized. In general, VM instances comprise a type of computing environment (e.g., a program or operating system) that is based upon a software abstraction layer within a computing system. In this context, a VM instance is often called a "guest" while the environment in which it operates is called a "host." VM instances are typically created to execute a set of instructions different than that of the host environment. Because VM instances are separated from the physical resources they use, the host environment is often able to dynamically assign those resources among the VM instances. Challenges can exist in that VM instances may be configured in a less than optimal fashion. For example, it could be the case that too many or too few VM instances are provisioned within an environment. Such provisioning can result in unnecessary consumption of computing resources, and/or inefficient processing of workloads.

SUMMARY

Embodiments of the present invention provide an approach for optimizing a configuration of virtual machine (VM) instances. In a typical embodiment, such optimization comprises either the splitting of a single VM instance into multiple VM instances or the consolidation of multiple VM instances into fewer (e.g., a single) VM instance. Along these lines, it will first be determined which VM instances would be good candidates for reconfiguration. Under one approach, VM instances that are candidates for reconfiguration are identified based upon an analysis of applicable/associated service level agreement (SLA) terms versus the performance of the VM instances. For example, VM instances can be reconfigured if such reconfiguration will maximize a benefit provided by the applicable SLA terms (e.g., if the splitting of a single VM instance into multiple VM instances would cause a workload to be processed more efficiently, resulting in a more favorable cost/benefit ratio). In another embodiment, candidate VM instances can be identified based upon a commonality of an entity (e.g., a consumer) associated therewith. For example, if a single entity is utilizing multiple VM instances, such VM instances could be considered candidates for consolidation to avoid unnecessary computing resource consumption.

A first aspect of the present invention provides a computer-implemented method for optimizing virtual machine instances in a networked computing environment, comprising: identifying a set of virtual machine (VM) instances in the networked computing environment that are potential candidates for optimization based upon at least one of the following: a performance of the set of VM instances with respect to a set of service level agreement (SLA) terms, or a commonality of an entity associated with the set of VM instances; and optimizing the set of VM instances by performing at least one of the following actions: splitting a single instance of the set of VM instances into multiple instances, or consolidating multiple instances of the set of VM instances into a single instance.

A second aspect of the present invention provides a system for optimizing virtual machine instances in a networked computing environment, comprising: a bus; a processor coupled to the bus; and a memory medium coupled to the bus, the memory medium comprising instructions to: identify a set of virtual machine (VM) instances in the networked computing environment that are potential candidates for optimization based upon at least one of the following: a performance of the set of VM instances with respect to a set of service level agreement (SLA) terms, or a commonality of an entity associated with the set of VM instances; and optimize the set of VM instances by performing at least one of the following actions: splitting a single instance of the set of VM instances into multiple instances, or consolidating multiple instances of the set of VM instances into a single instance.

A third aspect of the present invention provides a computer program product for optimizing virtual machine instances in a networked computing environment, the computer program product comprising a computer readable storage media, and program instructions stored on the computer readable storage media, to: identify a set of virtual machine (VM) instances in the networked computing environment that are potential candidates for optimization based upon at least one of the following: a performance of the set of VM instances with respect to a set of service level agreement (SLA) terms, or a commonality of an entity associated with the set of VM instances; and optimize the set VM instances by performing at least one of the following actions: splitting a single instance of the set of VM instances into multiple instances, or consolidating multiple instances of the set of VM instances into a single instance.

A fourth aspect of the present invention provides a method for deploying a system for optimizing virtual machine instances in a networked computing environment, comprising: providing a computer infrastructure being operable to: identify a set of virtual machine (VM) instances in the networked computing environment that are potential candidates for optimization based upon at least one of the following: a performance of the set of VM instances with respect to a set of service level agreement (SLA) terms, or a commonality of an entity associated with the set of VM instances; and optimize the set VM instances by performing at least one of the following actions: splitting a single instance of the set of VM instances into multiple instances, or consolidating multiple instances of the set of VM instances into a single instance.

BRIEF DESCRIPTION OF THE DRAWINGS

These and other features of this invention will be more readily understood from the following detailed description of the various aspects of the invention taken in conjunction with the accompanying drawings in which.

Figure 1:
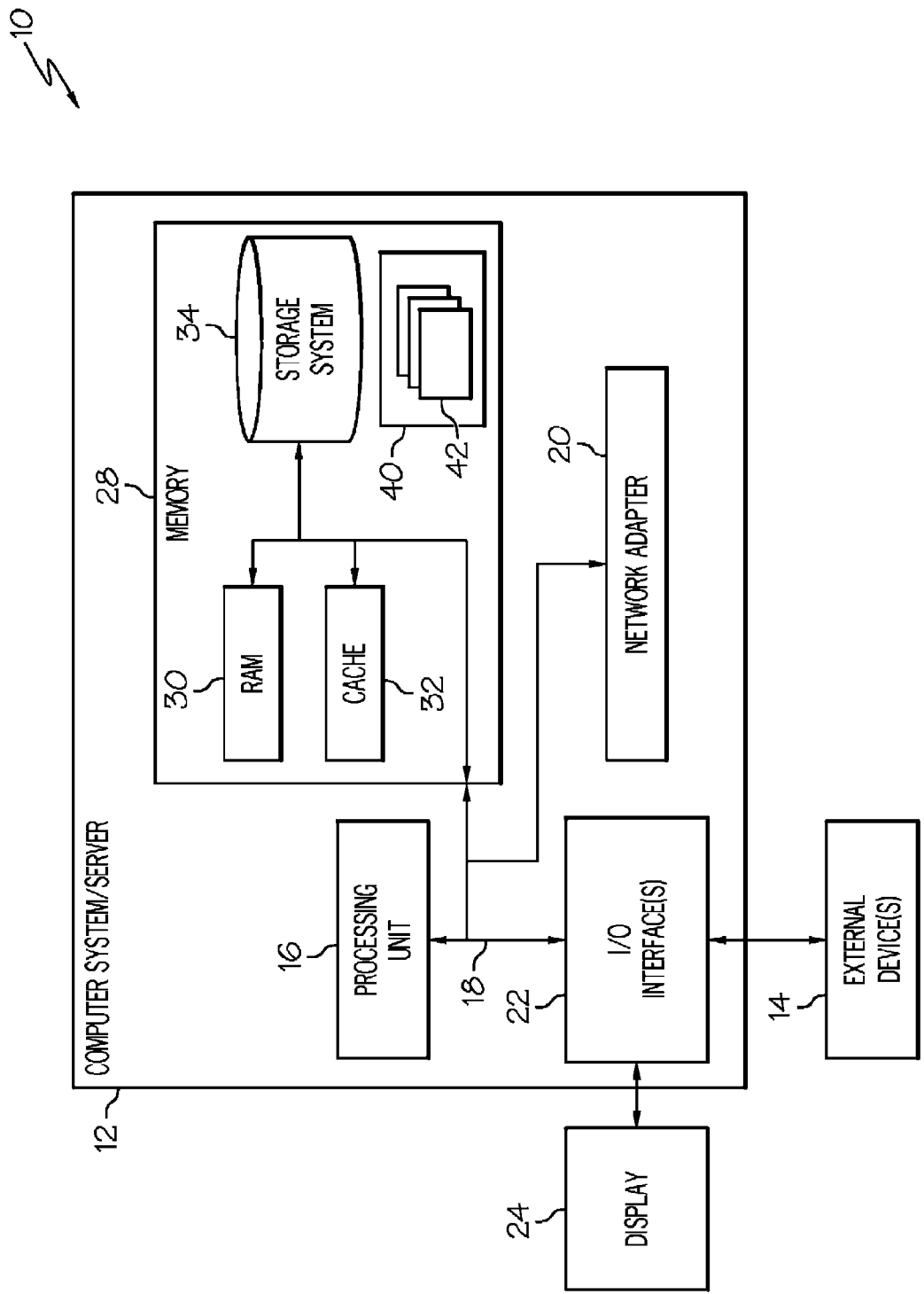
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

SUMMARY

Embodiments of the present invention provide an approach for optimizing a configuration of virtual machine (VM) instances. In a typical embodiment, such optimization comprises either the splitting of a single VM instance into multiple VM instances or the consolidation of multiple VM instances into fewer (e.g., a single) VM instance. Along these lines, it will first be determined which VM instances would be good candidates for reconfiguration. Under one approach, VM instances that are candidates for reconfiguration are identified based upon an analysis of applicable/associated service level agreement (SLA) terms versus the performance of the VM instances. For example, VM instances can be reconfigured if such reconfiguration will maximize a benefit provided by the applicable SLA terms (e.g., if the splitting of a single VM instance into multiple VM instances would cause a workload to be processed more efficiently, resulting in a more favorable cost/benefit ratio). In another embodiment, candidate VM instances can be identified based upon a commonality of an entity (e.g., a consumer) associated therewith. For example, if a single entity is utilizing multiple VM instances, such VM instances could be considered candidates for consolidation to avoid unnecessary computing resource consumption.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
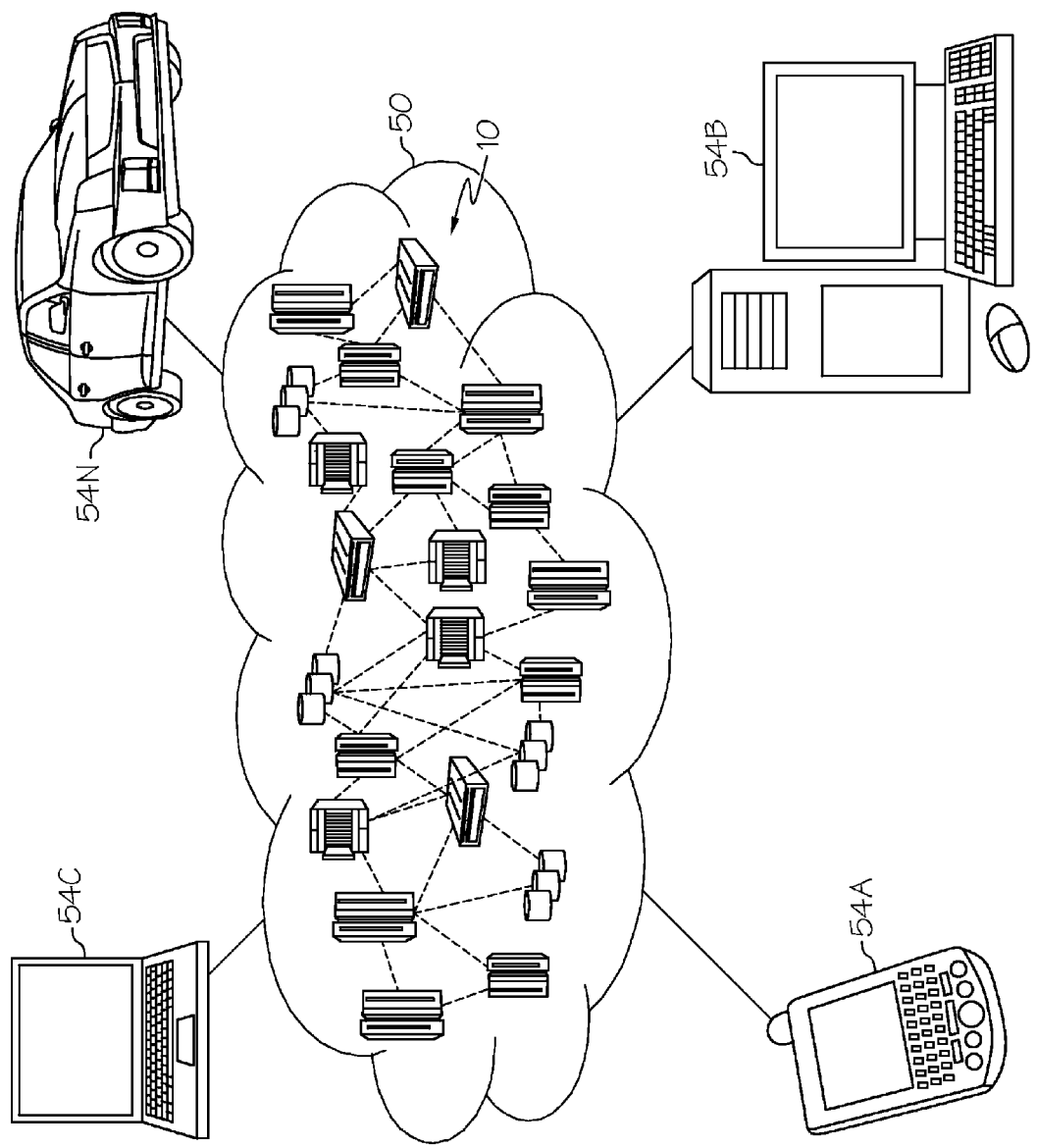
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
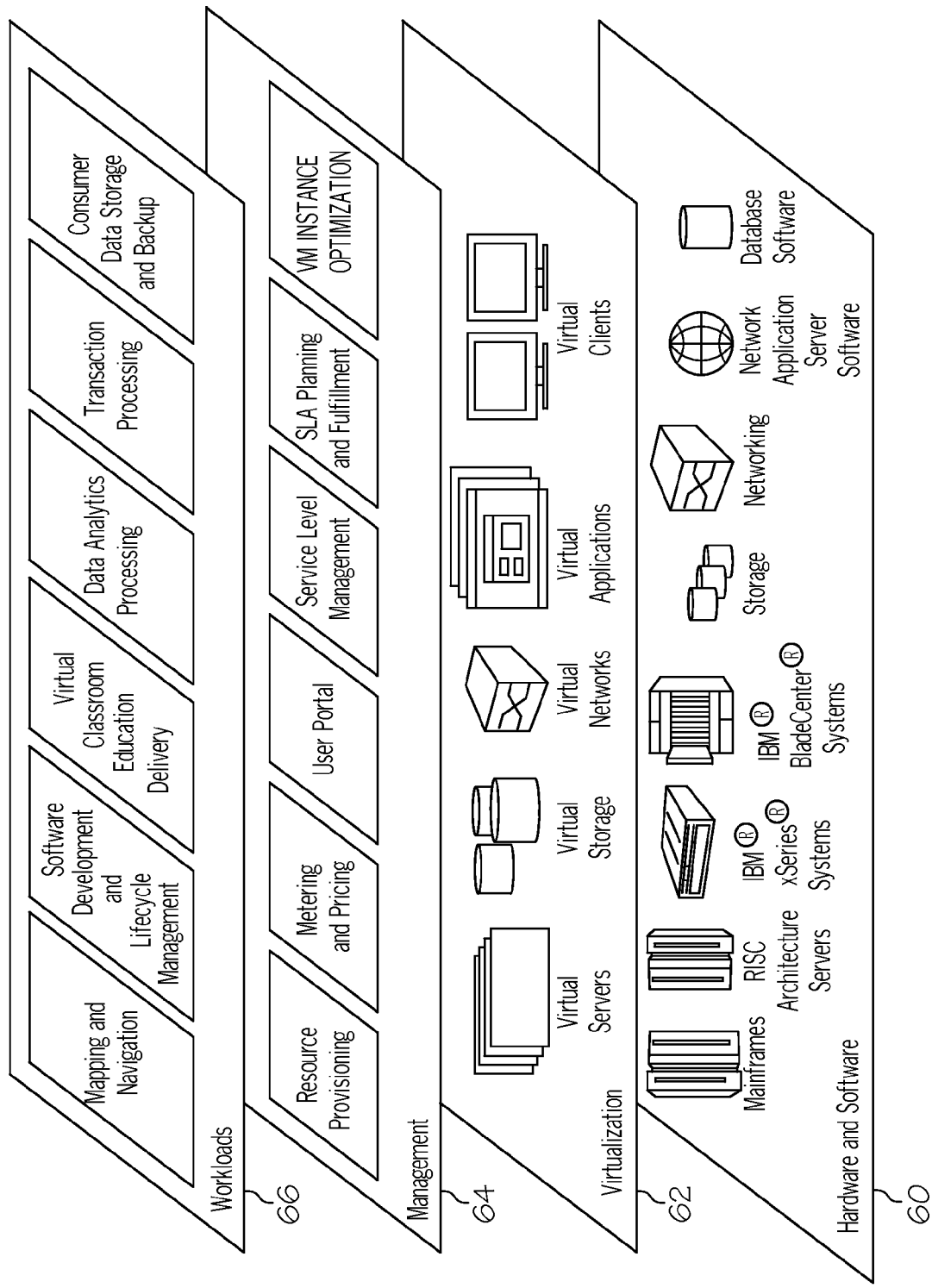
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides prearrangement for, and procurement of, cloud computing resources for which a future requirement is anticipated in accordance with an SLA. Further shown in management layer is VM instance optimization, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the VM instance optimization functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
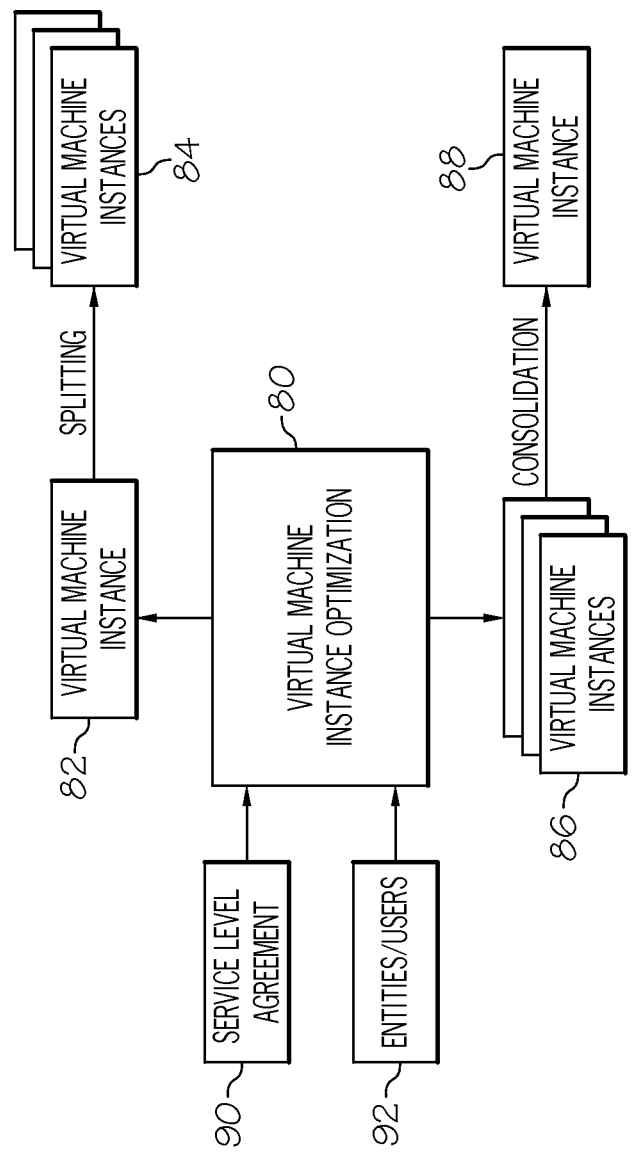
FIG. 4 depicts a system diagram according to an embodiment of the present invention.

Referring to FIG. 4, the approach provided under the embodiments of the present invention is depicted. Specifically, FIG. 4 represents a system diagram showing a process in which a VM instance optimization system 80 that provides VM instance configuration/reconfiguration. In a typical embodiment, VM instance optimization system 80 comprises one or more software programs/utilities such as program 40 of FIG. 1 that enables the functionality discussed herein and that is represented by the VM instance optimization function of management layer 64 of FIG. 3. Along these lines, VM instance optimization system 80 can comprise a rules engine or the like that is configured to split a single VM instance 82 into multiple VM instances 84 and/or consolidate multiple VM instances 86 into fewer (e.g., a single) VM instance 88. As will be further described below, such determinations can be made based upon one or more factors such as SLA terms 90 associated with the VM instances and/or commonality of entities 92 associated with the VM instances. It is understood in advance that the section headings that appear below are utilized for ease of reading purposes only and are not intended to indicate a particular relevance of one section over another.

Identification of Reconfiguration Opportunities

The following describes two methods to determine opportunities to reconfigure (e.g., consolidate and/or split) service VM instances of the same VM instances template type. Service VM instances are defined as VM instances which host generic services such as a database or middleware. The following criteria are indicative of good VM instance candidates to be reconfigured.

1) The VM instances are operating on average below the SLA (say using less than 50% of the requested resources) but have periodic spikes of resource usage. The user still needs to maintain the large SLA for peak usage but can consolidate these like-VM instances together since peaks will most likely not coincide.
2) The VM instances are primarily managed by the same individual. One way this can be determined is if the VM instances being accessed mostly come from the same IP address. If the same individual is managing multiple services, combining these like-VM instances together reduces the number of instances that must be maintained.

Consolidation Opportunities

When these similar criteria are observed, then the VM instances should be selected for reconfiguration. The following two algorithms determine good consolidation candidates based on the two previously mentioned examples of consolidation criteria.

Determination Algorithm 1: Selecting Consolidation Candidates Using SLA
    1. For each customer c do:
    2. For each VM instances Template t which has at least one currently provisioned instance do:
    3. candidateList=[ ]
    4. for each instance i for template t do:
    5. if max usage of VM instance i is <50% of SLA do:
    6. candidateList.append(i)

Determination Algorithm 2: Selecting Consolidation Candidates Using Same Access ID Function Prototype/Description:
    get Majority Access ID(VM instance i)—This method determines an ID (be it IP address or login name or some other identifier) which is primarily accessing VM instance i. If no one ID has over 50% of the accesses, then null is returned.

Algorithm Steps:
    1. for each customer c do:
    2. for each VM instances Template t which has at least two currently provisioned instance do:
    3. candidateGroups=HashMap<String,List>
    4. for each instance i for template t do:
    5. MainID=getMajority AccessID(i)
    6. If mainID==null do:
    7. Continue
    8. cg=consolidationGroups.get(mainID)
    9. if cg==null do:
    10. new consolidation List=[i]
    11. consolidationGroups.put(mainID,newconsolidation List)
    12. else:
    13. cg.append(i)
    14.
    15. finalCandidateGroups=[ ]
    16. for candidate group list cgl in candidateGroups do:
    17. if cgl.length >=2 do:
    18. finalCandidateGroups.append(cgl)

Once a list of the good consolidation candidates has been determined, these candidates can be presented to the consumer for consideration, consumer authorization may be requested before consolidation because the consolidation process allows partial VM instances access between projects which may be an unwanted security threat.

Split Opportunities

In addition to determining when a VM instance should be consolidated, there are times when a service VM instance should be split into multiple service VM instances. This should be done in scenarios where high-value customers have demanding SLA agreements and their associated service VM instances are close to its maximum usage. For example, say project 1 and project 2 were consolidated and project 2 had a high-value SLA. Consider the possibility that the average load of the consolidated service VM instances are >90% of the SLA. Since project 2 has a high-value SLA which must be maintained, it is safer to now separate the VM instances into their own service VM instances. The algorithm to determine split candidates can be found below:

Determination Algorithm 3: Selecting Split Candidates Using SLA
1. For each customer c do:
2. candidateList=[ ]
3. for each service VM instance i which contains multiple service do:
4. if max usage of i is >90% of SLA do:
5. candidateList.append(i)

Figure 5:
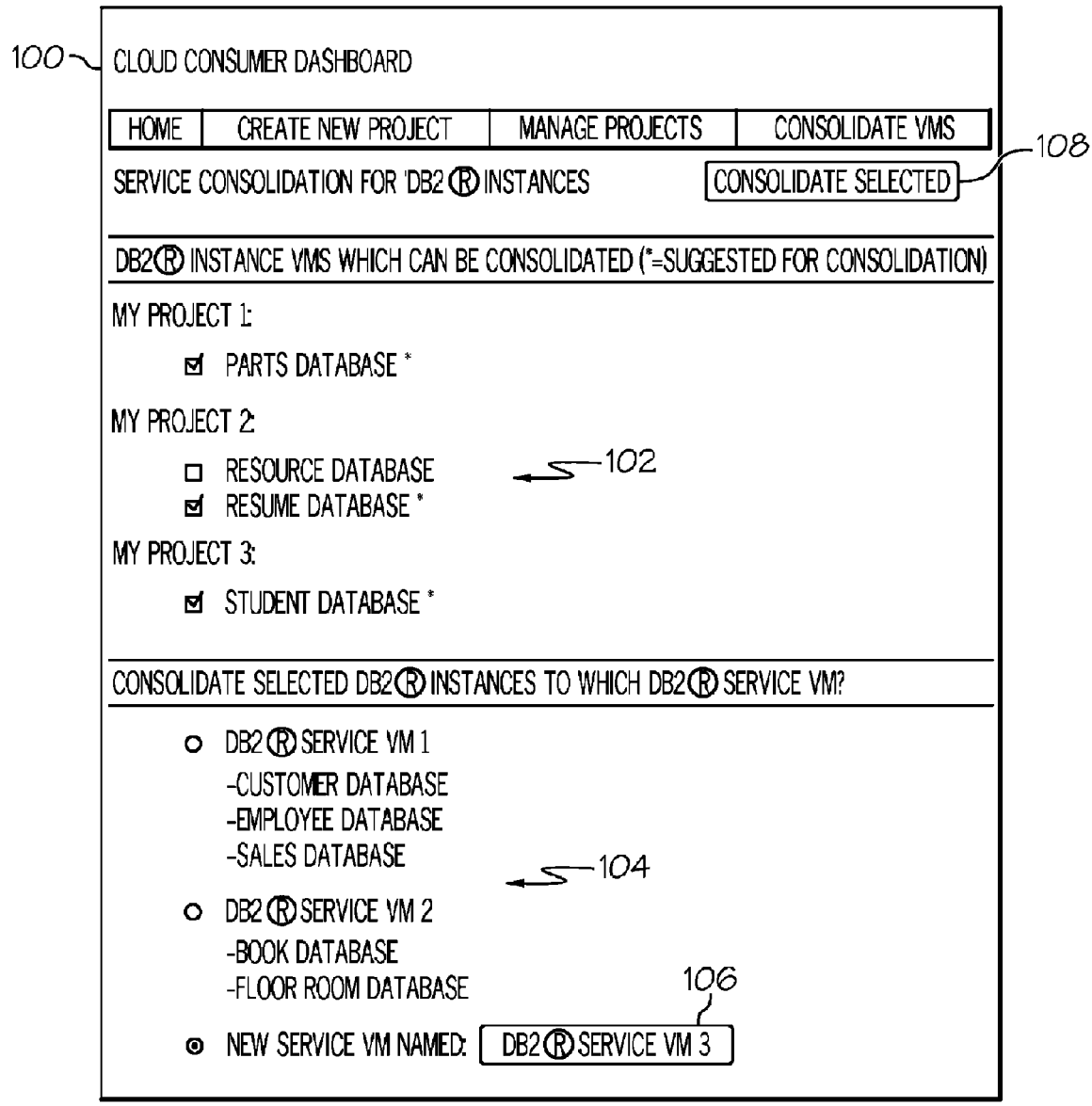
FIG. 5 depicts an illustrative user interface for VM instance configuration according to an embodiment of the present invention.

Referring to FIG. 5, an illustrative interface 100 for reconfiguring VM instances is shown. It is understood in advance that although FIG. 5 depicts a VM instance consolidation operation, a similar interface can be presented for a VM instance split operation. As depicted, interface 100 comprises: a candidate area 102 for listing VM instances that have a potential to be consolidated; a selection area 104 for selecting VM instances to be consolidated; an VM instance addition area 106 for requesting new VM instances, and an action mechanism 108, the selection of which will cause VM instances selected via selection area 104 to be consolidated.

Reconfiguration Algorithm

This section described the process that occurs once VM instance candidates have been identified and/or selected. Specifically, the following are the steps in the general consolidation/split (collectively referred to as reconfiguration) algorithm:
1. Update Network Configuration (either 1) internal project or 2) separate resource pool)
2. Create Resources (used only in the split process)
3. Move Services (implementation defined by the ISV image provider)
4. Update Service Pointers (via 1) topology info update, 2) proxy update, or 3) IP update)
5. Delete Unused Resources (used only in the consolidation process)

Figure 6:
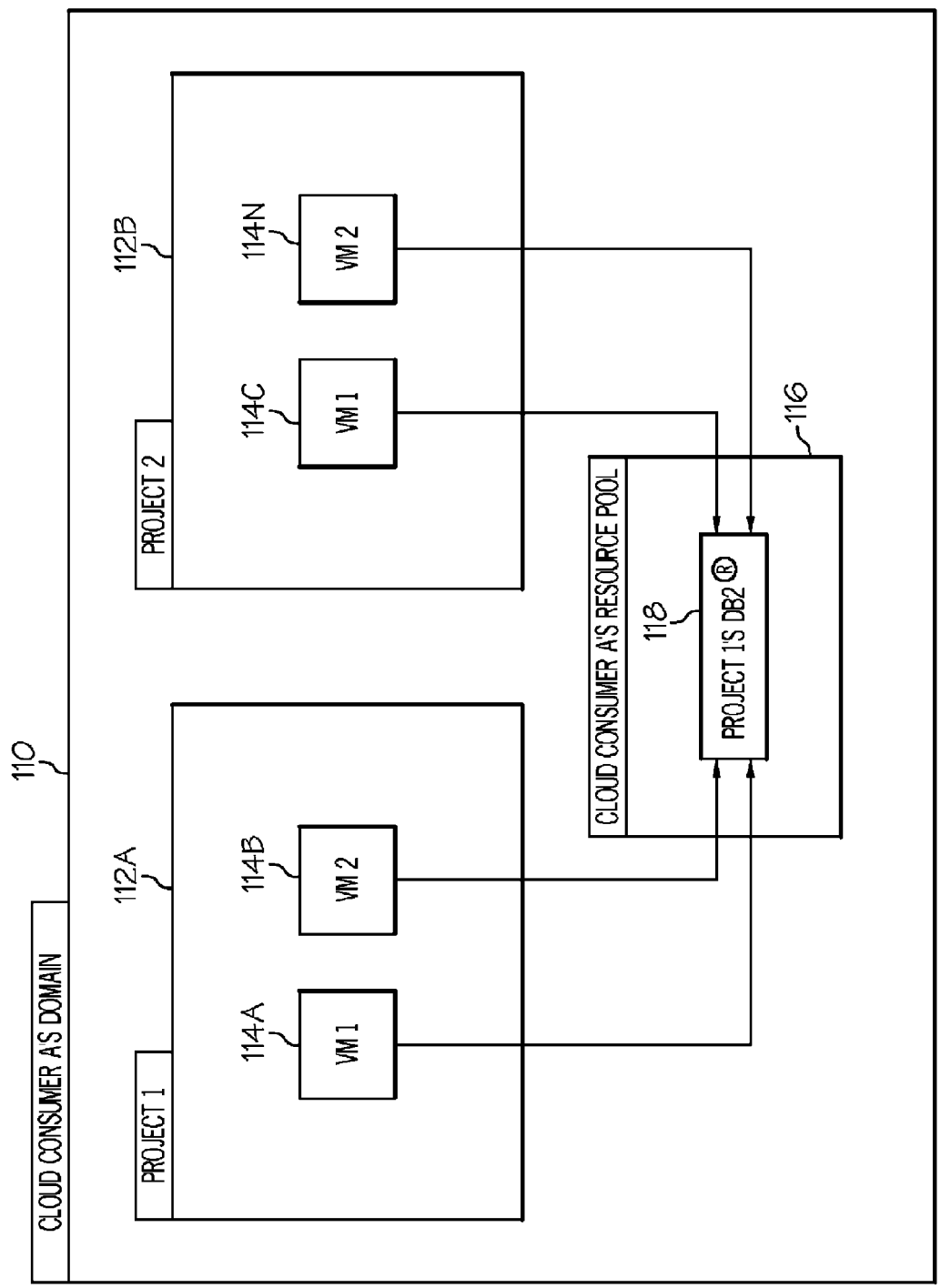
FIG. 6 depicts an illustrative block diagram showing the movement of a project pursuant to a consolidation operation according to an embodiment of the present invention.

Resources: e.g., VM instances which contain any number of services of the same type
Services: e.g., DB2 database services or Websphere Application Server (WAS) services Step 1—Update Network Configuration:

This initial step configures a firewall with the appropriate Virtual local Area Network (VLAN) and IP/port information. Depending on the level of required security two methods can be employed:
1. Keep the main consolidated VM instances in the project security zone. This method is particularly useful (among other situations) when the projects sharing resources can be trusted among themselves. This is typically the case since the service consolidation scope will usually be limited to one cloud consumer.
2. Pull the consolidated VM instances into a pool security zone which is independent of any projects. This is more secure since it does not allow a project direct access to the VM instances in another project. An example of this is shown in FIG. 6. As depicted, a domain 110 is shown in which two projects 112A-B are being performed. Each project has VM instances 114A-N. As further, rather than each project leverage its own project database (DB) 118 and 120, a consolidated resource pool 116 is created hereunder having the needed project DB 118 that both projects 112A-B can leverage. This avoids both projects from needing separate DBs.

Step 2—Create Resources:

This step is only needed during the split process to create additional VM instances resources. This step creates new service VM instances of the same type which will contain at least one of the services after the split process has been completed.

Step 3—Move Services:

Once the resources and the necessary network configuration are complete, the VM instance optimization 80 can start the consolidation/split process. This involves calling the
Instance1.incorportateServicesRunningOn (instance 2);
step as defined in the main disclosure for consolidation or the
Instance1.splitServicesOnto (instance 2);
step for the split process. How to choose which instance should be which, and which service(s) to split will be further discussed below.

Figure 7:
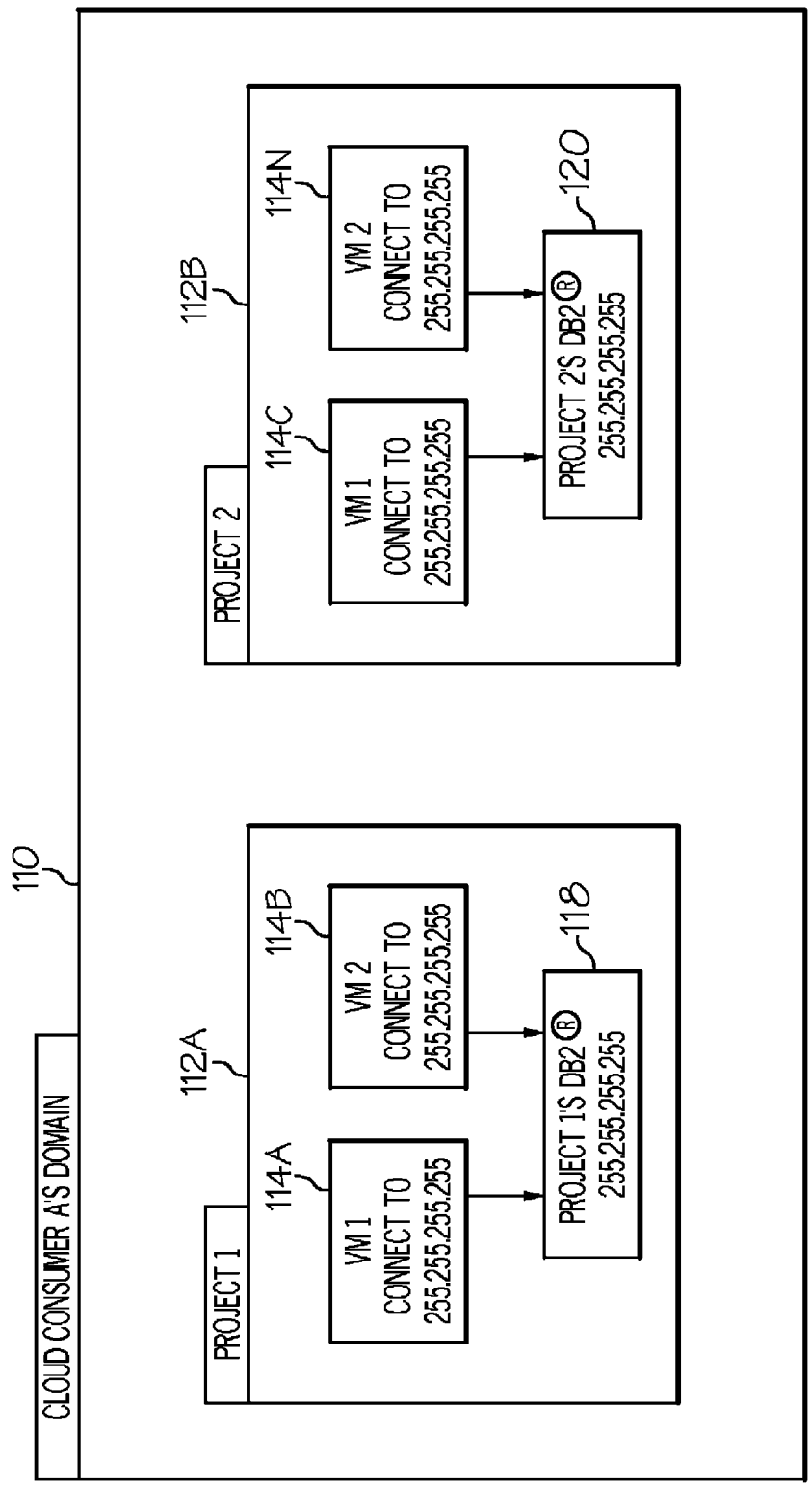
FIG. 7 depicts an internet protocol (IP) configuration prior to a consolidation operation according to an embodiment of the present invention.
Figure 8:
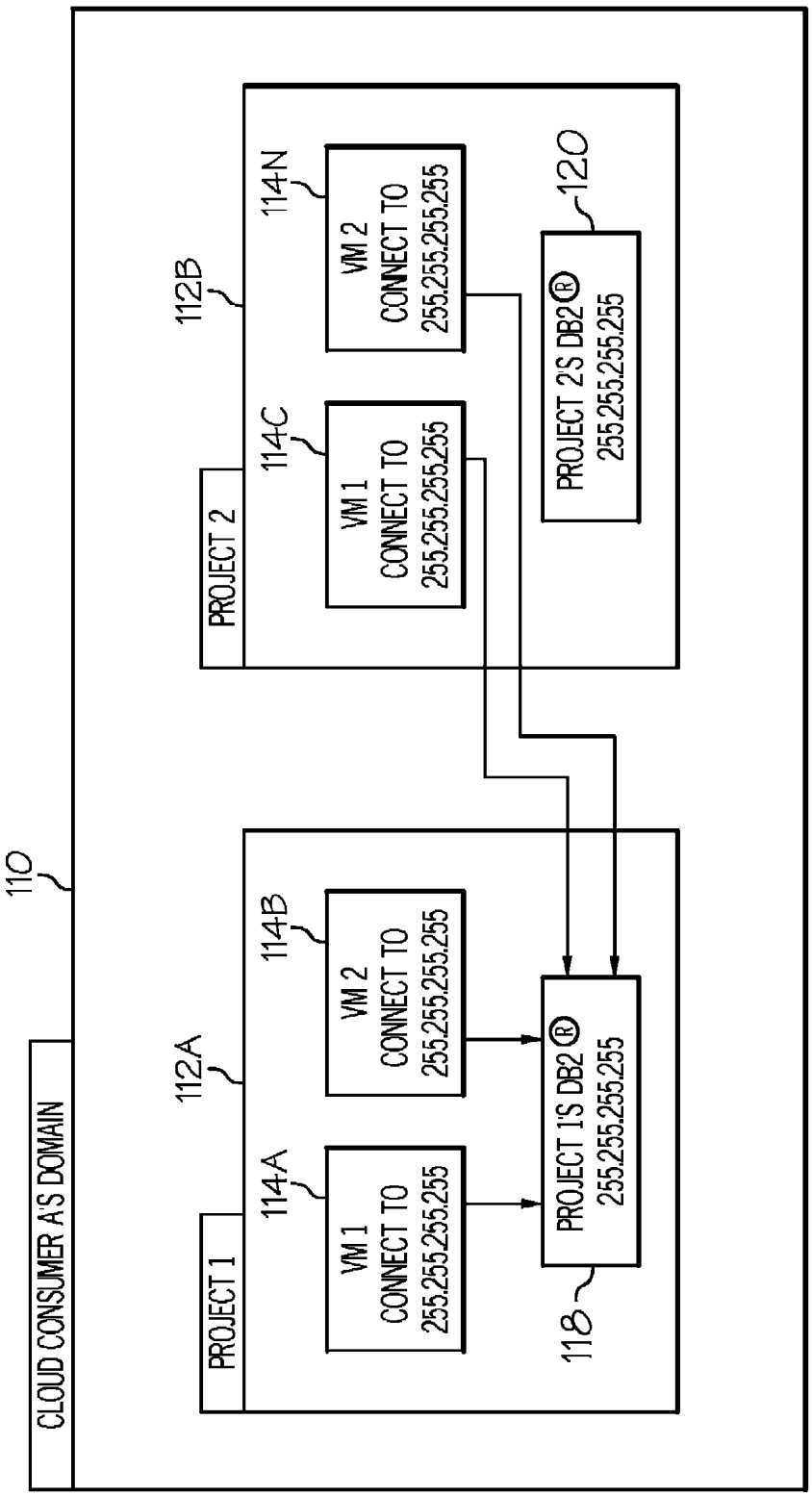
FIG. 8 depicts an internet protocol (IP) configuration after a consolidation operation according to an embodiment of the present invention.

Step 4—Update Service Pointers:

There are a number of ways to update the pointers to the resource VM instances after the consolidation/splitting has taken place. The first two were introduced hereinabove, but a more advanced update process is described as well.
1. Topology Information: This method uses topology information which was retained from the initial project deployment to know directly which pointers need to be updated. For instance, when project 2's VM instance1 and VM instances are provisioned, the cloud system knows that they are connected to Project 2's DB instance. When a consolidation/split occurs, this connection information is retrieved and used to update the connections to point to the new consolidated/split VM instances.
2. Proxy Instance: This method uses one proxy server for each cloud consumer in order to serve as an intermediary. The proxy can be configured either as a Domain Name Server (DNS) type service or as a direct data pass through. One difference is that the direct pass through is more secure since it does not allow direct project-to-project access, but it does require a scaling implementation if lots of data is being passed through the proxy.
3. Service IP addresses: This method uses the concept of service IP addresses in order to change the links between service VM instances. In order to change the links between two VM instances, the IP address of the old service VM instances are adopted by the consolidated VM instances. FIGS. 7 and 8 depict a before and after process for updating service pointers based on the domain 110, project 112A-B, and VM instances 114A-N shown in FIG. 6. As depicted first in FIG. 7, the VM instances 114A-N in respective projects 112A-B each point to their own project DB 118 and 120, respectively. Under the teachings recited herein, the service pointers can be changed so that the service pointers for each VM instance 114A-N point to a common project DB 118, as shown in FIG. 8. In general, this involves changing the target IP address.

During the split process, the service IP method can only split services grouped under different IP addresses. That is, a prior consolidation could be necessary for a split to occur since consolidation is the only way for a service VM instance to have multiple IP addresses. This is not typically an issue since a majority of splits occur when a consolidated service VM instance outgrows its current capacity.

Step 5—Delete Unused Resources:

The final step is to delete any resources which are no longer required. This step is only applicable in a consolidation scenario where a VM instance has been completely consolidated into another service VM instance and is no longer running any services.

Determining which Services to Move to which Locations

While it has been described above how to determine which services are consolidation/split candidates, this section will discuss how it is determined which VM instances should be maintained for consolidations and which services should be separated during the split processes.

Consolidation

1. Choose the consolidation path which will take the least amount of time. This method used the following function:

instance1.timeToConsolidateServices( )

which would be a part of the Independent Software Vendor (ISV) image provider's interface Application Programming Interface (API). This function could then again be called on instance2 which would give the relative amount of time to consolidate instance2 into another VM instances. The algorithm then chooses the VM instances which would take the most time to consolidate. This results in minimizing the overall move time since the services which take the longest time to consolidate will not be moved. The following is an algorithm describing how to choose a consolidation path that will take the least amount of time:

1. for each candidate VM instance i to consolidate do:
2. mostTimeToConsolidate=null
3. if mostTimeToConsolidate==null II
4.     mostTimeToConsolidate.timeToConsolidateService( )<i.timeToConsolidateService( )do
5. mostTimeToConsolidate=i Splitting 1. Choose the service(s) which require the lesser amount of time to move. This method looks through all of the services on the VM instances to be split and selects the service which requires the least time to move via the instanceToSplit.timeToSplit (Services)

method. The timeToSplit( ) method would be a relative time and would be implemented by the ISV image provider. This method can also be configured to move a given percentage of the services with the least move time (e.g. split 30% of the total number of services and move the ones which take the least time to move).

The following is an algorithm describing how to minimize split time:

1. For each service in a VM instance i to be split do:
2. leastTimeToSplit=null
3. if leastTimeToSplit==null II
4. LtimeToSplit(s)<LtimeToSplit(leastTimeToSplit) do:
5. leastTimeToSplit=s 2. Choose the service(s) which holds the higher-value SLAs. This method looks through all of the services on the VM instances and chooses the service which is associated with the highest-value SLA via the instanceToSplit.valueOfSLA (service s)

method. By separating the highest-value SLA into a separate VM instance, it will be easier for the VM instance optimization system to maintain that SLA. This method can be configured to split off a given percentage of the high-value SLA services (e.g. split 30% of the total number of services and move the ones with the highest-value SLA). The following is an algorithm describing how to split the VM instance having the highest value SLA (maximize the reward):

1. for each service in a VM instance i to be split do:
2. mostHighValueSLA=null
3. if mostHighValueSLA==null II
4. i.valueOfSLA(s)>i.valueOfSLA (mostHighValueSLA) do:
5. mostHighValueSLA=s One noteworthy property of the previously disclosed consolidation/split algorithm is that it can occur automatically. That is, at any point during the consolidation/split process, the entire cloud can be reverted to the state before the consolidation/split was initiated. This is noteworthy since it prevents the cloud from becoming inconsistent due to failures. For example, assume that the consolidation/split process failed midway through the update service pointers step and the algorithm was not atomic. Under such a scenario, there would be VM instances communicating to both new and old service VM instances which would result in data loss. However, when the consolidation/split process fails with atomicity, the cloud is reverted to the state before the consolidation/split occurred, thus preventing any inconsistencies.

In addition, under the embodiments recited herein, VM instances can be pooled. Service VM instances consolidations can incorporate the concepts of SLA terms in two distinct ways, each with their own benefits. Under one method, VM instances with differing SLA terms are pooled into the same service VM instances pool. This method groups VM instances into service VM instances pools with differing SLA terms. The idea is that high-value SLA VM instances would be able to consume the lower-value SLA VM instances' resources within the same pool as needed. When the high-value SLA VM instances do not require the resources however, the lower-value SLA VM instances would be free to use those resources without interfering with the high-value SLA VM instances. Under an alternate method, VM instances with similar SLA terms can be pooled into the same service VM instances pool. This latter method keeps all low-value SLA VM instances in the same service VM instances pool and all high-value SLA VM instances in another. By doing this, a cloud management system would be able to direct the majority of its resources to the high-value SLA service VM instances pool while the low-value SLA pools could have lower priority.

To increase the security while using a proxy configuration, deep packet inspections can be used in order to ensure port misuse does not occur. For instance, when DB2 VM instances are being consolidated, DB2 traffic must be passed through the proxy server to the VM instances where those services will now be available. As all access to those services will be through the proxy, deep packet inspection can be used to verify that the data being transmitted back and forth is reasonable under the assumption that the packets are DB2 traffic.

Illustrative Example

This section will utilize the above-referenced teachings within the confines of a consolidation operation. It is understood that a similar process could be utilized for a splitting operation. In this example, once a consumer (e.g., a cloud consumer) decides which VM instances to consolidate, the consolidation process can begin. It is further noted that this consolidation algorithm utilizes a consolidation service to exist in a virtual image template which can then be used by the cloud management software to do the following.

VM instancesTemplateInstance Instance1;
VM instancesTemplateInstance instance2;
Instance1.incorportateServicesRunningOn (instance2).

This functionality can be implemented through a service on a particular port of the VM instance which will take another instance of the same type's access information such as IP address and password. With this information, all the services running on instance 2 will, after consolidation, be running on instance 1. The cloud will then be able to delete instance 2 as all services are now provided on instance 1. It will be in the best interest of the cloud image provider to implement this consolidation API since images which do will be more attractive to cloud consumers because of the increased consolidation flexibility.

Figure 9:
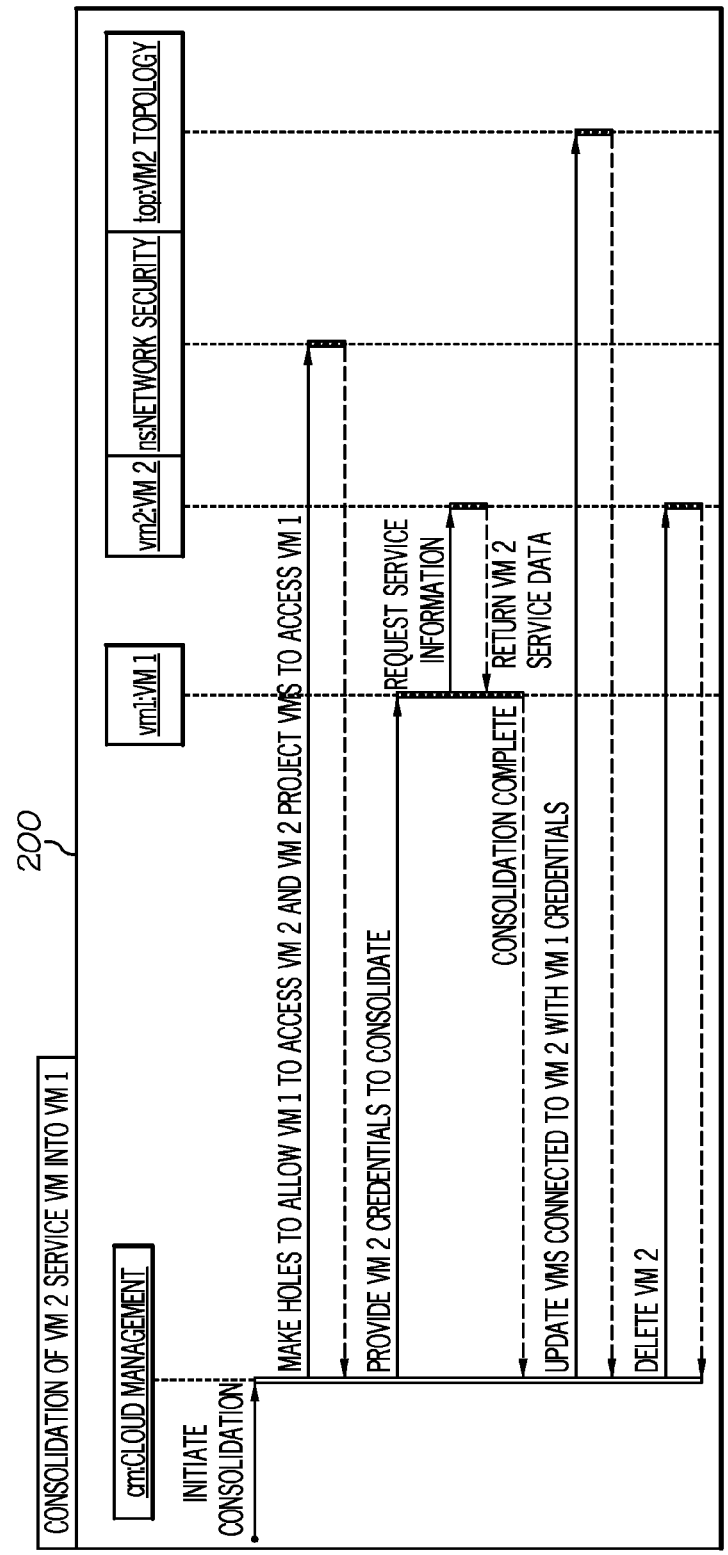
FIG. 9 depicts a process flow diagram according to an embodiment of the present invention.

FIG. 9 depicts a process flow diagram 200 showing an overview of the consolidation process/operation. As shown, "holes" are opened to allow VM instance 1 to access VM instance 2 and vice versa. Thereafter, credentials associated with VM instance 2 are provided to VM instance 1. Next, service information is requested and corresponding service data returned to VM instance 2. At this point the consolidation is complete and VM instance 1 is now connected to VM instance 2, and VM instance 2 is updated with credentials associated with VM instance 1. Lastly, the consolidated VM instance (e.g., VM instance 2) is deleted.

Before the consolidation algorithm is explained in greater detail, an explanation will be given for the "Update Service Connections" (e.g., step 3). Specifically, there are at least two implementations for step 3. The first is a straightforward direct update of all the existing service connections using the provisioning topology. The second, however, requires that a customer-wide proxy be used for each type of service VM instances. The proxy VM instances act similar to a DNS directory for accessing services. While this may result in increased overhead with the extra VM instances, it enables simpler consolidation and enables consolidation in environments where the original provisioning topology is not accessible. The following algorithm describes how to consolidate VM instances using the aforementioned direct and proxy methods.

Inputs:
1. VM instance 1=The VM instances which will host all service after the consolidation.
2. VM instance 2=the VM instances whose services will be transferred to VM instances 1.

Figure 10:
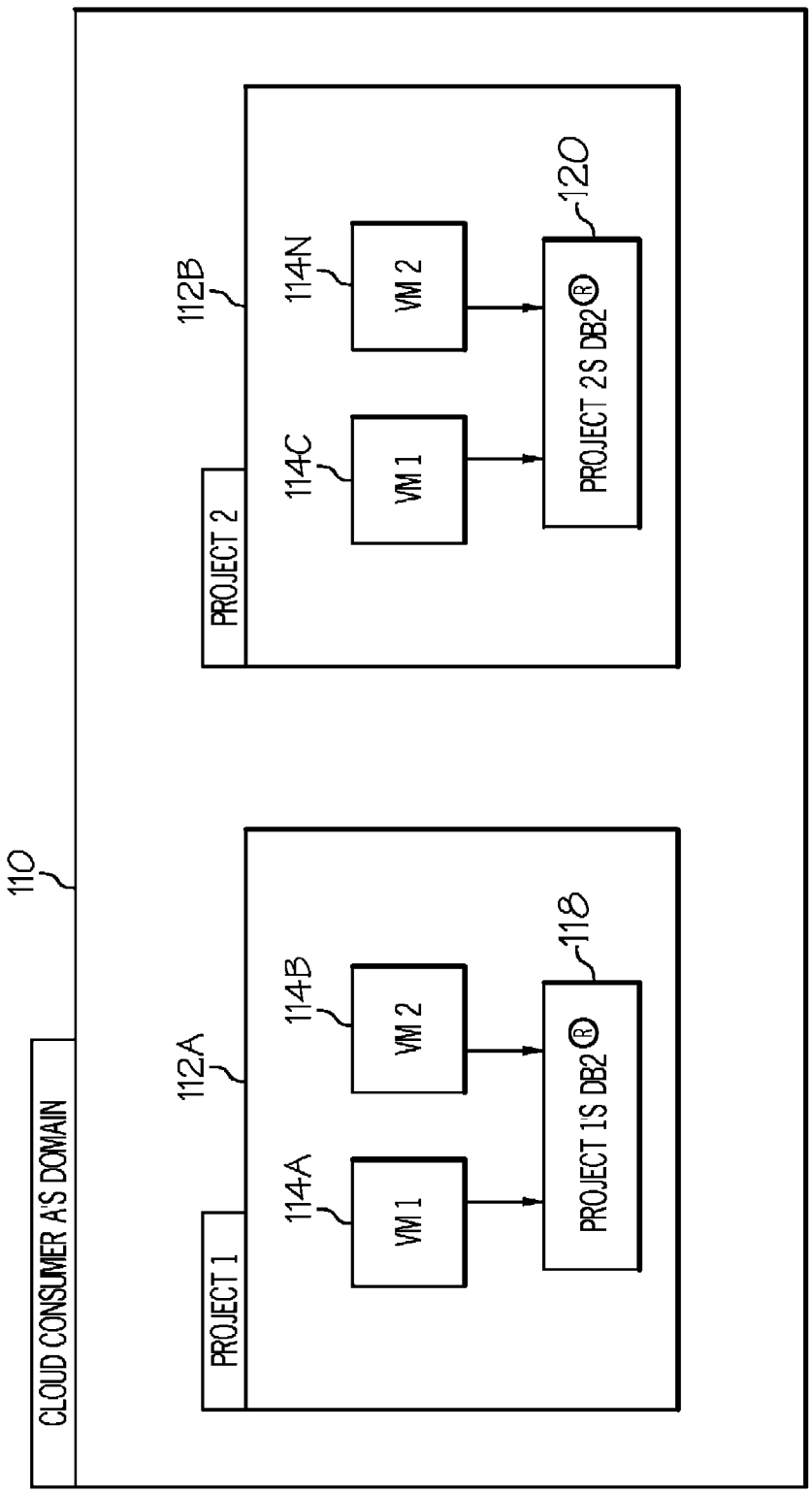
FIG. 10 depicts a database (DB) configuration before service connections are updated using a direct method according to an embodiment of the present invention.
Figure 11:
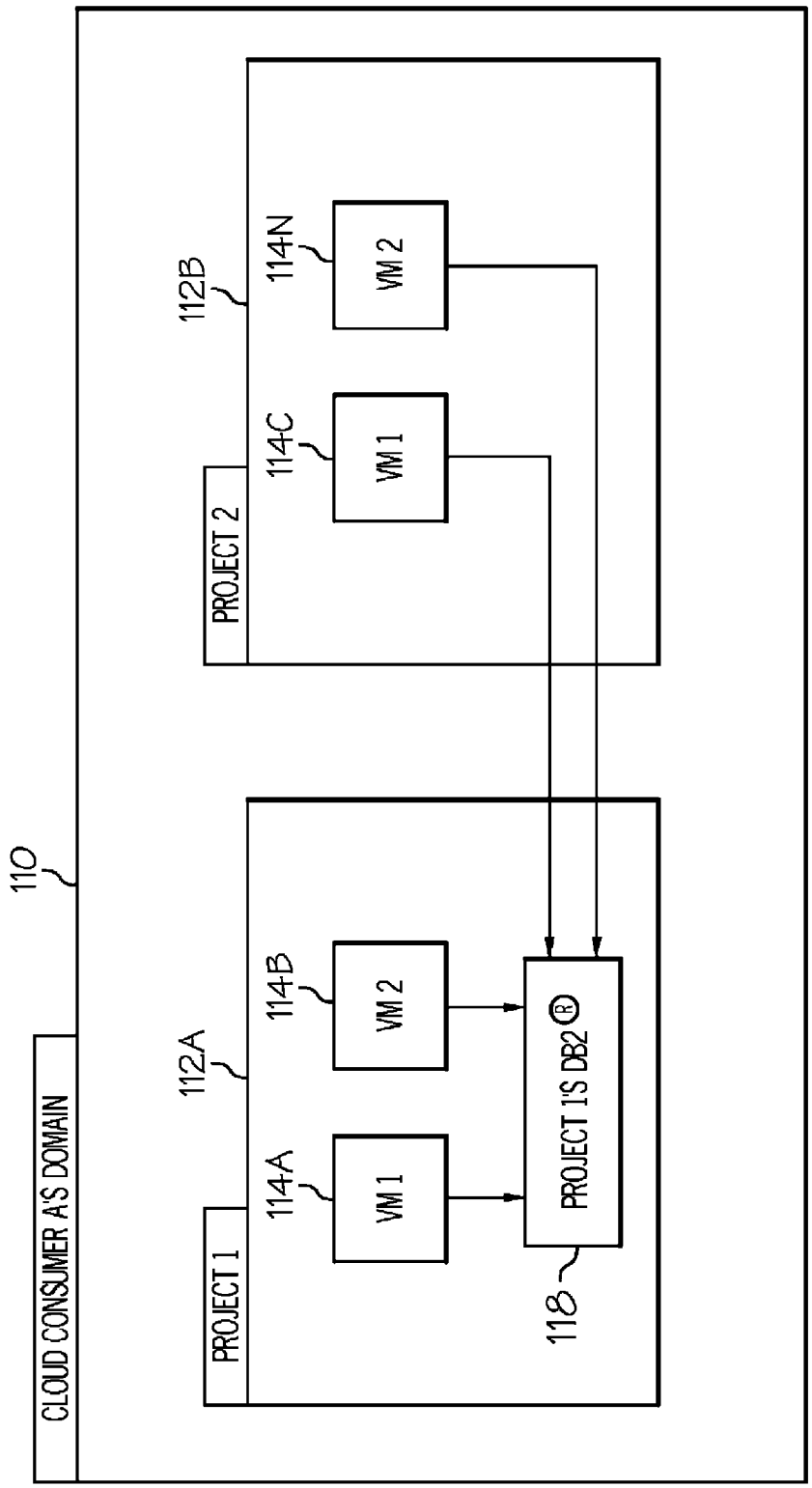
FIG. 11 depicts a database (DB) configuration after service connections are updated using the direct method according to an embodiment of the present invention.
Figure 12:
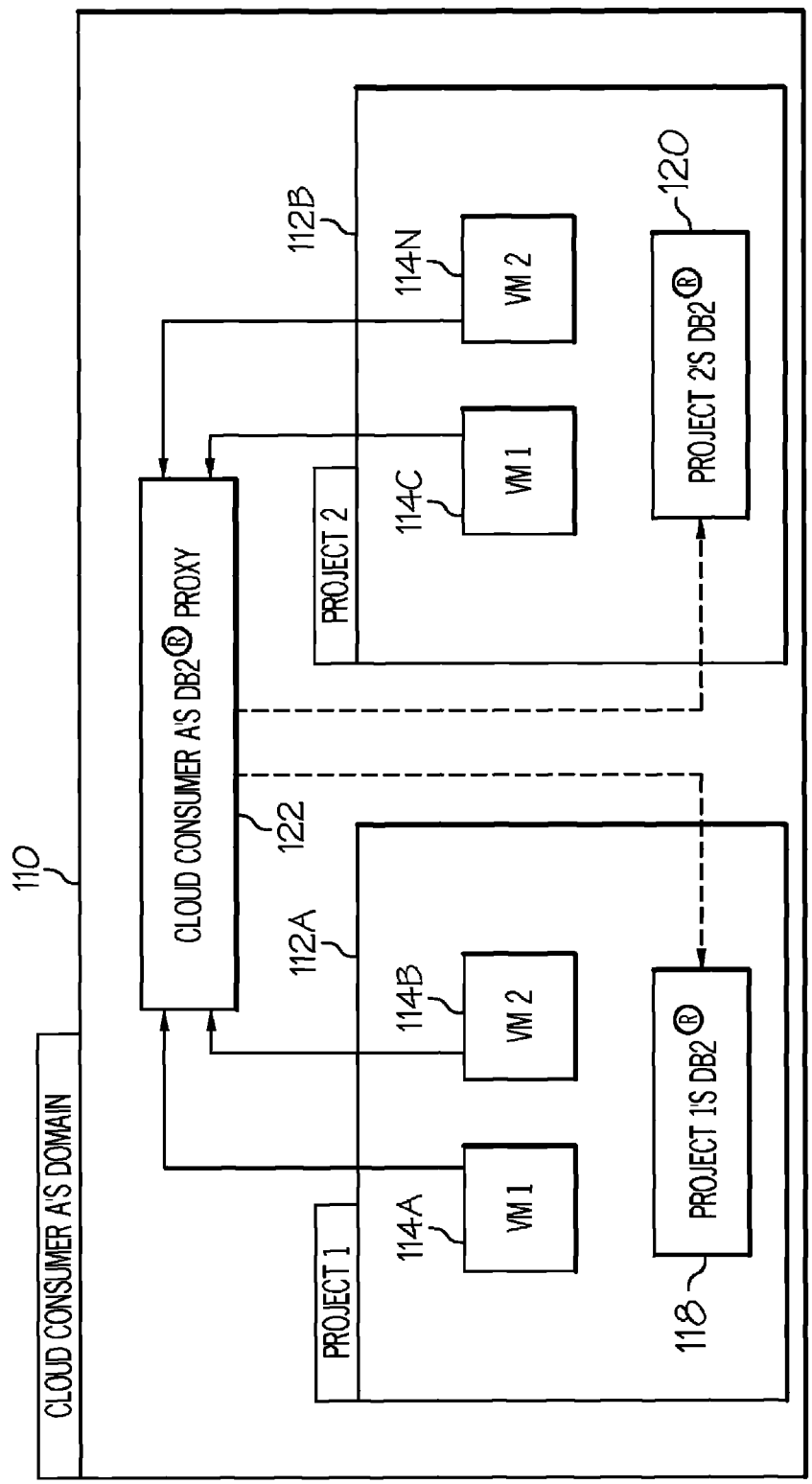
FIG. 12 depicts a database (DB) configuration before service connections are updated using a proxy method according to an embodiment of the present invention.
Figure 13:
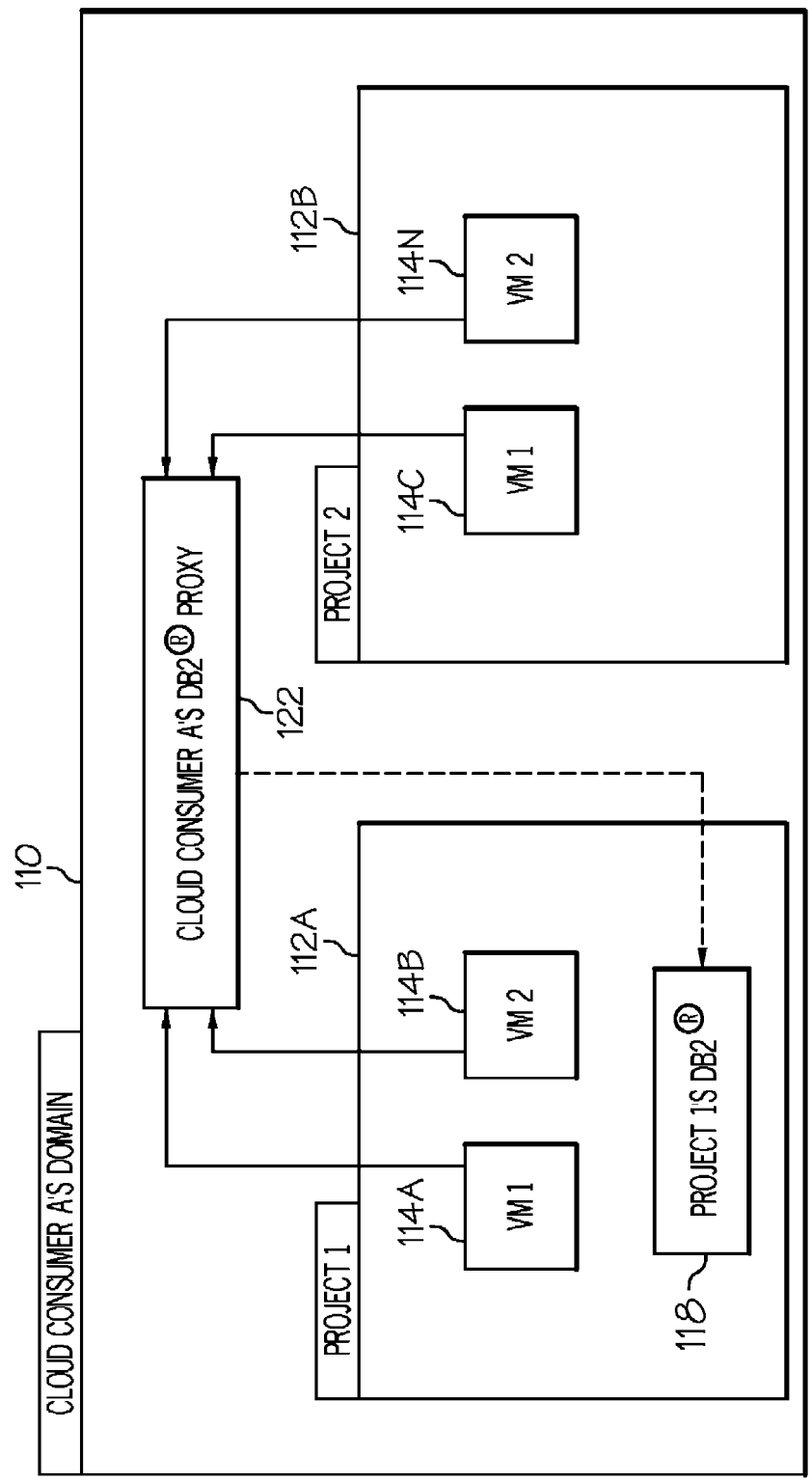
FIG. 13 depicts a database (DB) configuration after service connections are updated using the proxy method according to an embodiment of the present invention.

Algorithm Steps:
1. Open selective access between projects: Since VM instances 1 will need to access VM instances 2 and the VM instances in VM instances 2's project will now need to talk to VM instances 1, a pinhole must be opened between the VLANs to allow for cross-communication. This can be done by configuring the networking firewalls in a similar way to when the VLANS are set up initially. (Note: this step is not necessary if VM instances 1 and VM instances 2 are in the same project.)
2. Copy VM instances 2's service into VM instances 1: From the Cloud Management software, connect to VM instances) on the consolidation service listening on a specified VM instances 1 port. Over this connection, provide the necessary information for VM instances 1 to log into VM instances 2. This will initiate the service consolidation code written by the image provider to connect to VM instances 2 and pull/propagate over all information necessary to continue VM instances 2's services on VM instances 1. This consolidation process may include increasing VM instances 1's resources to accommodate VM instances 2's services.
3. a) Update service connections (direct connection): Since the VM instances in VM instances 2's project have access to VM instances 1 via the previously opened pinholes, all the service connections can now be updated. Using a topological approach (e.g., Zepher) which was used to create VM instances 2's project, obtain a list of VM instances which are connected to VM instances 2. Rerun the initial configuration workflow for each of these VM instances and pass the access information for VM instances 1. This update will change all VM instances 2 pointers to VM instances 1 instead. An example of the direct connection approach is shown in FIGS. 10-11. Both Figs. show domain 110, projects 112A-B, VM instances 114A-N, and project DBs 118 and 120. In FIG. 10, each VM instance 114A-N is connected to a project DB 118 and 120 within the project 112A-B with which the VM instances 114A-N are associated. In FIG. 11, the VM instances 114C-N in project 112B are disconnected from project DB 120 and instead directly connected to project DB 118 in project 114A.
   b) Update service connections (proxy connection): Alternatively, updating service connections in the situation where a customer-wide service proxy exists can be readily performed. The cloud management software can log into the service proxy and change all the VM instances 2 references to VM instances 1. Therefore the next time any VM instances in VM instances 2's project resolves the service location with the proxy, they will then be directed to VM instances 1. An example of the proxy connection approach is shown in FIGS. 12-13. Both Figs. shown domain 110, projects 112A-B, VM instances 114A-N, project DBs 118 and 120, and DB2 proxy 122. In FIG. 12, each VM instance 114A-N is connected to DB2 proxy 122, which in turn is connected to both project DBs 118 and 120. Conversely, in FIG. 13, DB2 proxy 122 is coupled only to project DB 118 (DB2® is a trademark of IBM Corp in the United States and/or other countries).
4. Delete VM instances 2: Once all the services previously running on VM instances 2 have been transferred over to VM instances 1 and all VM instances 2 pointers have been changed, VM instances 2 can safely be deleted.

Figure 14:
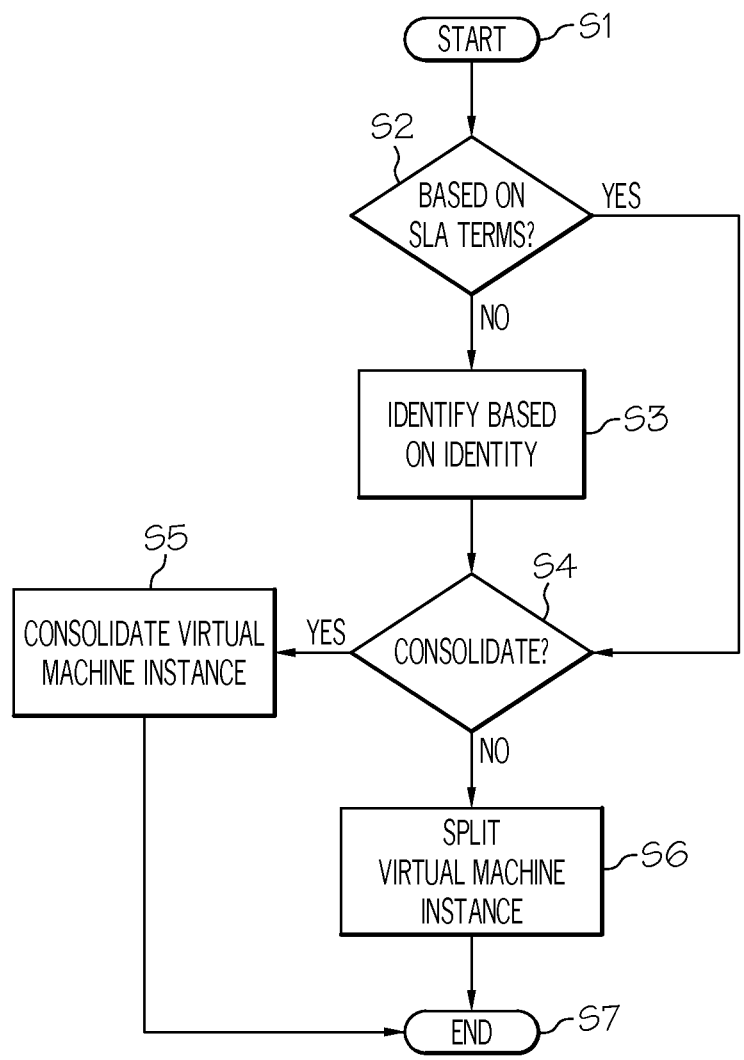
FIG. 14 depicts a method flow diagram according to an embodiment of the present invention.

Referring now to FIG. 14, a method flow diagram according to an embodiment of the present invention is shown. After the processes is started in step S1, it is determined in step S2 whether a set of VM instances will identifying based upon a performance of the set of VM instances with respect to a set of service level agreement (SLA) terms. If not, the set of VM instances will be identified based upon a commonality of an entity associated with the set of VM instances in step S3. In either event, once the set of VM instances that are candidates for optimization (e.g., reconfiguration) are identified, it will be determined in step S4 whether the optimization of the set of VM instances will occur via a consolidation operation. If so, the set of VM instances are consolidated in step S5 before the processes is ended in step S7. However, if consolidation operation does not occur, optimization will occur via a split operation in step S6 before the process is ended in step S7.

While shown and described herein as a VM instance optimization solution, it is understood that the invention further provides various alternative embodiments. For example, in one embodiment, the invention provides a computer-readable/useable medium that includes computer program code to enable a computer infrastructure to provide VM instance optimization functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/ useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide VM instance optimization functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for VM instance optimization. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for optimizing virtual machine instances in a networked computing environment, comprising:
    identifying, with at least one computer device, a set of virtual machine (VM) instances in the networked computing environment that are potential candidates for optimization based upon a commonality of an entity that is utilizing the set of VM instances, each of the set of VM instances being based upon a software abstraction layer, which includes an operating system, within a host machine and being provisioned separately on the host machine; and
    optimizing, with the at least one computer device, the set of VM instances by consolidating multiple instances, which each have at least one unique project that is unique from any project of others of the set of VM instances, of the set of VM instances into a single instance having all unique projects from the multiple instances of the set of VM instances.

2. The computer-implemented method of claim 1, the identifying comprising determining whether an actual usage of the set of VM instances are below a predefined threshold as compared to a target usage as set forth in a set of SLA terms.

3. The computer-implemented method of claim 1, the identifying comprising comparing a user identification corresponding to each of the set of VM instances to one another.

4. The computer-implemented method of claim 1, the optimizing comprising:
    updating a network configuration associated with the set of VM instances;
    moving a set of services associated with the set of VM instances;
    updating a set of service pointers associated with the set of services; and
    deleting a set of unused resources.

5. The computer-implemented method of claim 4, further comprising creating a set of resources in the event the optimizing comprises splitting.

6. The computer-implemented method of claim 4, the moving comprising:
    identifying the set of services; and
    determining at least one location to move the set of services.

7. The computer-implemented method of claim 1, the optimizing comprising moving a set of services associated with the set of VM instances, the set of services being identified based upon at least one of the following: a minimization of a time needed to perform the identifying, or a maximization of at least one benefit associated with a set of SLA terms.

8. A system for optimizing virtual machine instances in a networked computing environment, comprising:
    a bus;
    a processor coupled to the bus; and a memory medium coupled to the bus, the memory medium comprising instructions to:

identify a set of virtual machine (VM) instances in the networked computing environment that are potential candidates for optimization based upon a commonality of an entity that is utilizing the set of VM instances, each of the set of VM instances being based upon a software abstraction layer, which includes an operating system, within a host machine and being provisioned separately on the host machine; and optimize the set of VM instances by consolidating multiple instances, which each have at least one unique project that is unique from any project of others of the set of VM instances, of the set of VM instances into a single instance having all unique projects from the multiple instances of the set of VM instances.

9. The system of claim 8, the memory medium further comprising instructions to determine whether an actual usage of the set of VM instances is below a predefined threshold as compared to a target usage as set forth in a set of SLA terms.

10. The system of claim 8, the memory medium further comprising instructions to compare a user identification corresponding to each of the set of VM instances to one another.

11. The system of claim 8, the memory medium further comprising instructions to:

update a network configuration associated with the set of VM instances;

move a set of services associated with the set of VM instances;

update a set of service pointers associated with the set of services; and delete a set of unused resources.

12. The system of claim 11, the memory medium further comprising instructions to create a set of resources in the event the optimizing comprises splitting.

13. The system of claim 11, the memory medium further comprising instructions to:

identify the set of services; and determine at least one location to move the set of services.

14. The system of claim 8, the optimizing comprising moving a set of services associated with the set of VM instances, the set of services being identified based upon at least one of the following: a minimization of a time needed to perform the identifying, or a maximization of at least one benefit associated with a set of SLA terms.

15. A computer program product for optimizing virtual machine instances in a networked computing environment, the computer program product comprising a computer readable storage device media, and program instructions stored on the computer readable storage media, to:

identify a set of virtual machine (VM) instances in the networked computing environment that are potential candidates for optimization based upon commonality of an entity that is utilizing the set of VM instances, each of the set of VM instances being based upon a software abstraction layer, which includes an operating system, within a host machine and being provisioned separately on the host machine; and optimize the set VM instances by consolidating multiple instances, which each have at least one unique project that is unique from any project of others of the set of VM instances, of the set of VM instances into a single instance having all unique projects from the multiple instances of the set of VM instances.

16. The computer program product of claim 15, the computer readable storage media further comprising instructions to determine whether an actual usage of the set of VM instances is below a predefined threshold as compared to a target usage as set forth in a set of SLA terms.

17. The computer program product of claim 15, the computer readable storage media further comprising instructions to:

update a network configuration associated with the set of VM instances;

move a set of services associated with the set of VM instances;

update a set of service pointers associated with the set of services; and delete a set of unused resources.

18. The computer program product of claim 17, the computer readable storage media further comprising instructions to create a set of resources in the event the optimizing comprises splitting.

19. The computer program product of claim 17, the computer readable storage media further comprising instructions to:

identify the set of services; and determine at least one location to move the set of services to.

20. The computer program product of claim 15, the optimizing comprising moving a set of services associated with the set of VM instances, the set of services being identified based upon at least one of the following: a minimization of a time needed to perform the identifying, or a maximization of at least one benefit associated with a set of SLA terms.

\* \* \* \* \*